United States Patent [19]
Chapuis et al.

[11] 3,922,555
[45] Nov. 25, 1975

[54] PORTABLE INSTRUMENT FOR SELECTIVELY DETECTING ALPHA-PARTICLES DERIVED FROM RADON

[75] Inventors: Anne Marie Chapuis; Danielle DaJlevic, both of Fontenay aux Roses, France

[73] Assignee: Commissariat a l'Energie Atomique, Paris, France

[22] Filed: July 10, 1973

[21] Appl. No.: 377,927

[30] Foreign Application Priority Data
July 13, 1972  France .............................. 72.25550

[52] U.S. Cl. ................................................ 250/472
[51] Int. Cl. ................................................ G01t 1/02
[58] Field of Search .......... 250/472, 473, 336, 393, 250/395, 428, 432, 435, 253, 255, 327, 370, 371, 526, 303, 304

[56] References Cited
UNITED STATES PATENTS
3,505,523  4/1970  Becker .............................. 250/473
3,558,884  1/1971  Babich et al. ...................... 250/393
3,665,194  5/1972  Alter et al. ......................... 250/323

*Primary Examiner*—James W. Lawrence
*Assistant Examiner*—Davis L. Willis
*Attorney, Agent, or Firm*—Cameron, Kerkam, Sutton, Stowell & Stowell

[57] ABSTRACT

A portable instrument of the pocket type designed primarily for monitoring atmospheric contamination in uranium mines by selectively detecting the α-particles emitted simultaneously by the daughter products of radon, namely radium A and radium C'.

The instrument comprises in combination a tube containing a suction fan for drawing external air through a filter which retains the α-emitting aerosols, a detector in which the α-particles corresponding to the respective energies of the α-emissions of radium A and of radium C' are detected separately, and two collimators placed between the filter and the detector.

3 Claims, 3 Drawing Figures

PORTABLE INSTRUMENT FOR SELECTIVELY DETECTING ALPHA-PARTICLES DERIVED FROM RADON

This invention relates to portable instruments for detecting α-particles and measuring the concentration of radon which is present in uranium mines and is particularly harmful to man by reason of its two daughter products, namely radium A and radium C' which are alpha-emitters.

It is possible to compute the dose of alpha-particles emitted by radium A and C' when the radioactive derived products of radon are in balance with respect to each other. But accurate measurements have shown that these assumptions were wholly erroneous, especially by reason of the powerful ventilation provided in mine galleries and that there could consequently be substantial differences in concentrations varying quickly in time and space of radium A and radium C' at different points of one and the same mine gallery.

At the present time, the hazard which arises from inhalation of radon is evaluated by computing the total α-energy emitted by its daughter products. To this end, the radon concentration is measured at a few precise locations for given operations involved in mine exploitation by means of aerosols collected on a filter. The total α-energy emitted by the daughter products is then computed while postulating a certain unbalance factor which is different from the real factor. The dose attributed to a person is then computed by weighting the previously determined values of effective times spent by workers in these different locations.

The precautions taken in the choice of factors usually result in appreciable overestimation of the real dose.

Researches have been conducted for a number of years with a view to developing a personal dosimeter which is worn by miners. In particular, there is one known type of dosimeter which is equipped with an aerosol-sampling device and a suction fan driven by an electric micromotor. This instrument has been described in an article by J. A. Auxier et al. entitled "A new progeny personal dosimeter" and published in 1971 by Pergamon Press in "Health Physics", vol. 21, pages 126 to 128. The measurement performed by this type of dosimeter is not proportional to the total α-energy.

Furthermore, calibrations performed in the laboratory under conditions in which equilibrium is achieved are no longer applicable within a mine.

A primary aim of the invention is to overcome the disadvantages of known detectors and to differentiate selectively the energy of the α-particles emitted by radium A and by radium C' which are derived from radon.

To this end, provision is made in accordance with the invention for a portable instrument which essentially comprises in combination:

a device for sampling air through a filter which retains the α-emitting aerosols, a detector in which the α-particles corresponding to the respective energies of the α-emissions of radium A and of radium C' are detected separately, two collimators placed between the filter and the detector.

In one embodiment of the invention, the detector is fitted with screens having different thicknesses which correspond to the respective collimators and select the particles according to their energy.

In a further embodiment, the sensitive layers are fabricated from a cellulose compound.

All the elements constituting the instrument in accordance with the invention, namely the sensitive layer of the particle detector, the screens, the collimators and the sampling device are contained in a tube which can readily be worn by the user. The sampling device of known type comprises a filter for the aerosols and an electric motor with a suction fan.

The description relates to examples of construction which are described with reference to the accompanying drawings, wherein.

The principle of detection of alpha-particles by means of solid-state track detectors will first be recalled. By way of example, in order to obtain a "track" after etching in cellulose nitrate as proposed by the invention, an α-particle must have an energy within the range of a few hundred keV to 5 MeV approximately. Below 1 MeV, the particle leaves a track which does not pass completely through the detector. Between 1 and 3 MeV, the tracks appear at the same time, and pass through the detector if their orientation is not oblique. Between 3 and 5 MeV, the tracks appear more slowly as the energy of the α-particle is higher. For the same development, the diameter of each track is inversely proportional and smaller as the energy is higher if the etching time or time needed by the chemical solution for development of the film (sensitive layers 8) by the chemical solution is the same for all tracks. In point of fact, the particles emitted by radium A and radium C' have energies of 6 and 7.68 MeV respectively. It is therefore necessary to provide a screen for slowing-down said particles.

When a screen is placed in front of a source of alpha-particles, the spectrum of the emerging α-particles is composed of all the energies between 0 and the maximum energy corresponding to the particles which have a normal incidence.

If the α-particles of 6 MeV energy are slowed-down to a sufficient extent to be detectable, the α-particles of 7.68 MeV energy and of oblique incidence are also slowed-down to a sufficient extent to enable them to produce detectable tracks in their turn. It is therefore apparent that, in order to achieve separate detection of particles of 6 and 7.68 MeV energy, provision must be made for a collimation system.

Figure 1:
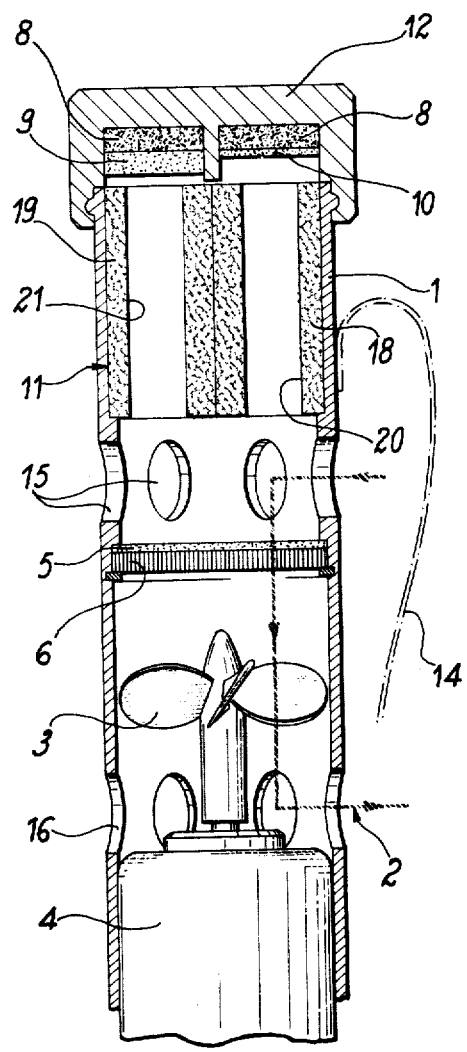
FIG. 1 is a schematic diagram of the instrument in accordance with the invention.

In accordance with the invention, the instrument which is illustrated in FIG. 1 is presented in the form of a tube 1 at one end of which is placed a sampling device 2 of a type known per se and comprising a fan 3 driven by an electric micromotor 4. The fan 3 is placed behind a filter 5 mounted on a sintered support 6 which is permeable to air. Provision is made at the other end of the tube 1 for elements which are disposed in the following order : a radiation detector 8, two screens 9 and 10 respectively having different thicknesses, two collimators 18 and 19. This assembly is retained by an end-cap 12 which is locked in position on the tube 1 and this latter can be provided with a pen clip 14 or any other suitable fastening means.

Peripheral openings are provided in some cases (openings 15) between the collimators 18-19 and the filter 5, and in other cases (openings 16) behind the fan 3. The openings 15 permit admission of the aerosols which are present in the atmosphere to be monitored and which are to be retained on the filter 5 whilst the openings 16 serve to discharge the sampled atmosphere.

The collimators 18 and 19 have bores 20 and 21 respectively; in the present example, the heights and diameters of the bores are identical. Satisfactory results have been obtained with the following dimensions:

height of bores: 20 mm
diameter of bores: 7 mm
distance between filter and detector: 22 mm.

Different ratios between dimensions could be adopted without modifying the scope of the invention.

In the example under consideration, the alpha detector is formed by a layer 8 of cellulose nitrate; the screen 10 is a polycarbonate layer 6 microns thick for detecting RaA and the screen 9 is a polycarbonate layer 25 microns thick for detecting RaC'. In practice, the screens 9 and 10 can be applied directly against the detector 8 or at the other end of the collimators.

The instrument of FIG. 1 operates in the following manner: the atmosphere to be monitored is sucked by the fan 3 through the openings 15. The aerosols are collected on the filter 5 and a fraction of the radiation produced by these latter penetrates into the bores 20 and 21 of the collimators 18 and 19. After the particles have passed into the bore 20 on the side corresponding to the collimator 18, the screen 10 slows-down the α-particles of RaA (6 MeV) to approximately 3 MeV, with the result that tracks are obtained in the detector 8. The α-particles of RaC' (7.68 MeV) are slowed-down to approximately 5.3 MeV and do not form any track.

After the particles have passed into the bore 21 on the side corresponding to the collimator 19, the α-particles of RaA (6 MeV) are stopped by the screen 9 and do not reach the detector 8. The α-particles of RaC' (7.68 MeV) are slowed-down by the screen 9 to 3 MeV and form a track in the detector 8.

By means of the numbers of tracks which are measured in the two areas of the detector 8, the total α-energy emitted by radium A and radium C' can readily be computed.

Figure 2:
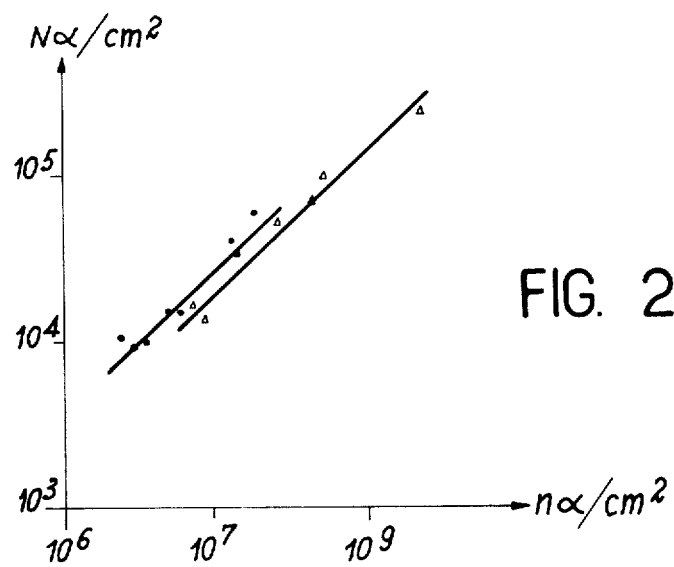
FIG. 2 is a diagram of the detection efficiency.
Figure 3:
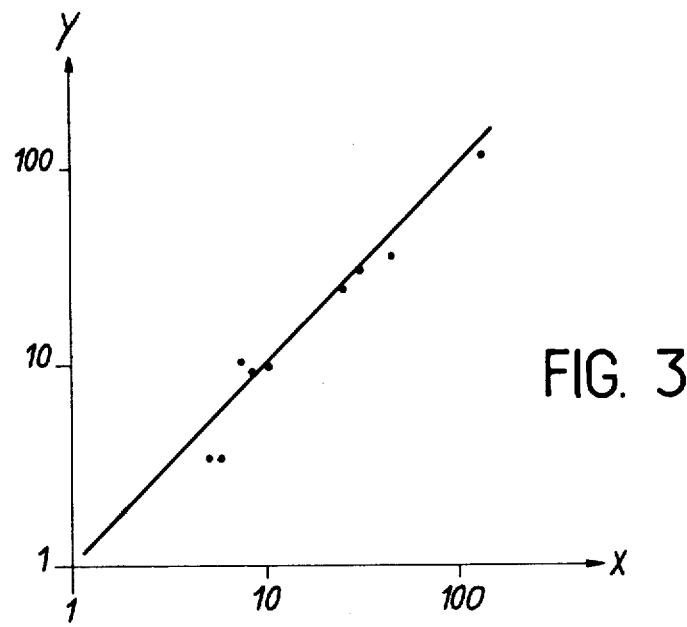
FIG. 3 is a diagram of the results of measurement.

FIG. 2 shows the relation between the number of tracks ($N\alpha/cm^2$) measured in the detector and the number of α-particles ($n\alpha/cm^2$) emitted by the filter 5. In accordance with conventional practice, the dots and triangles correspond respectively to RaA and to RaC'. The detection efficiency is linear. The results show (in FIG. 3) that good correspondence exists between the doses (Y) measured by the instrument and the energy dose (X) calculated by means of the formula $N_A \cdot E_A + N_{C'} \cdot E_{C'}$ (N being the number of particles and E being the energy) on the basis of the concentrations of radium A and radium C' which are measured with reference instruments. The units of the diagram of FIG. 3 are arbitrary.

What we claim is:

1. A portable instrument for selectively detecting the alpha-particles emitted simultaneously by radium A and radium C' which are derived from radon and more particularly for monitoring the atmosphere in mines, wherein said instrument comprises in combination:
   a device for sampling air through a filter which retains the α-emitting aerosols,
   a detector in which the α-particles corresponding to the respective energies of the α-emissions of radium A and of radium C' are detected separately,
   two collimators placed between the filter and the detector whereby said collimators direct the alpha radiation from the aerosols collected by said filter to said detector.

2. A detector according to claim 1, wherein the detector is fitted with sensitive layers associated with screens having different thicknesses which correspond to the respective collimators and select the particles according to their energy.

3. A detector according to claim 2, wherein the sensitive layers are fabricated from a cellulose compound.

* * * * *